UNITED STATES PATENT OFFICE.

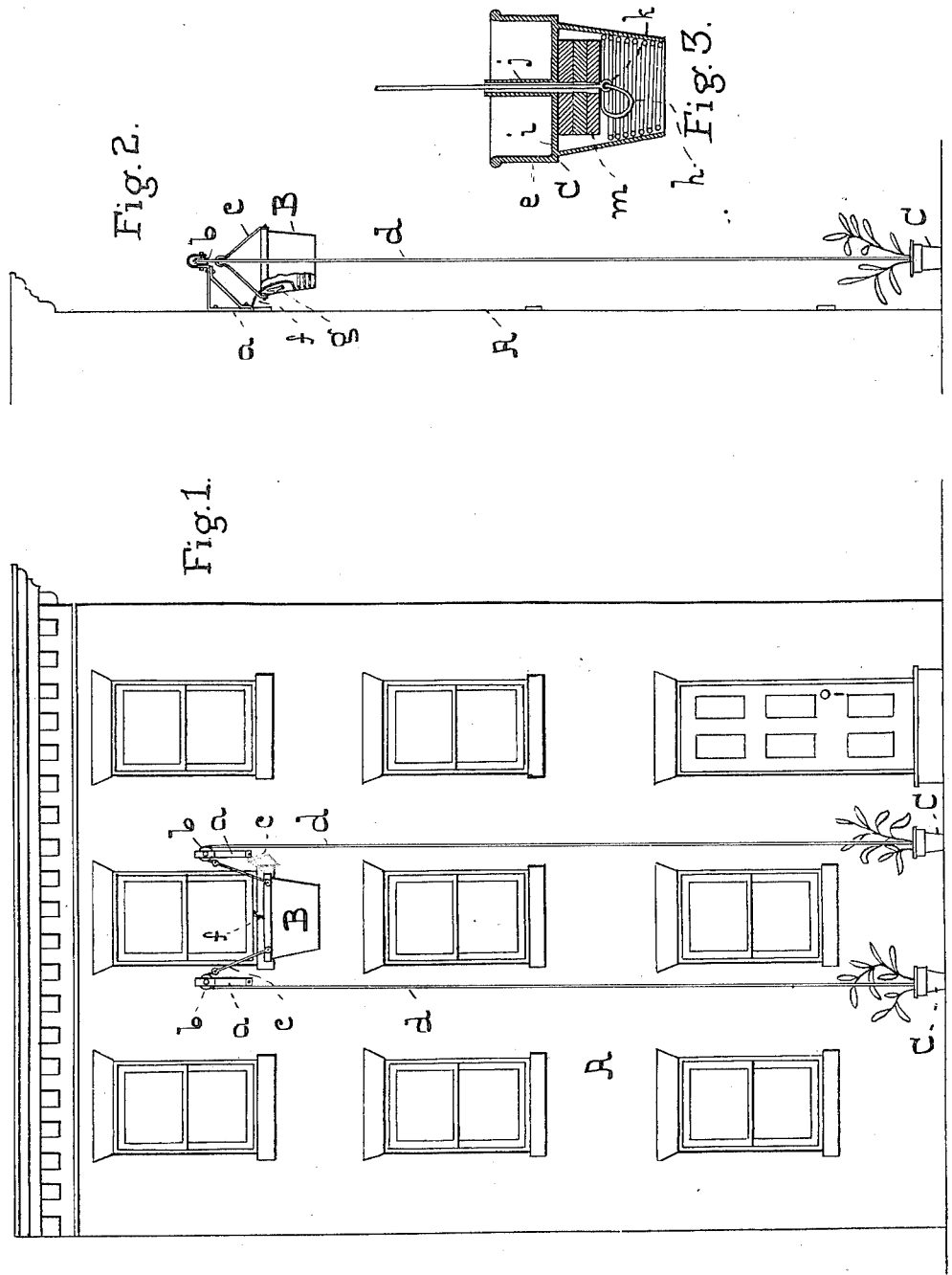

JAMES T. SMITH, OF BALTIMORE, MARYLAND.

FIRE-ESCAPE.

SPECIFICATION forming part of Letters Patent No. 649,769, dated May 15, 1900.

Application filed October 9, 1899. Serial No. 733,031. (No model.)

*To all whom it may concern:*

Be it known that I, JAMES T. SMITH, of the city of Baltimore, in the State of Maryland, have invented certain Improvements in Fire-Escapes, of which the following is a specification.

In the description of the said invention which follows reference is made to the accompanying drawings, forming a part hereof, in which—

Figure 1 is a front view of a house provided with the improved fire-escape. Fig. 2 is a side view of the same. Fig. 3 is an enlarged sectional view of a part of the invention.

Referring now to the drawings, A represents the front of a house. Secured to the front and situated at each side of a window accessible from different rooms or parts of the house is a bracket $a$, provided with a sheave $b$.

B is a basket formed of some light material, such as thin sheet metal, metallic strips, or woven wire. This basket is furnished with two hinged handles $c$, which are brought together and connected to a wire rope $d$. The ropes $d$ pass over the sheaves $b$ and extend to the ground, where they are attached to overbalancing-weights C, hereinafter more particularly described.

The length of the ropes $d$ is such that when the overbalancing-weights are on the ground the basket is near the window. In Figs. 1 and 2 the top of the basket is shown as on a level with the window-sill, and it may therefore be easily entered by persons escaping from the building.

The gravity of the two overbalancing-weights C is such as to overcome that of the basket and, in addition, nearly the average weight of a person, so that should a person enter the basket it will descend to the ground.

To prevent under any circumstances a too-rapid descent of the basket, I fasten to the window-sill or some other stationary object situated above the basket a check-line $f$, preferably a flexible wire rope, and coil it within the basket, as shown in Fig. 2, and provide the basket with a cleat $g$, around which the check-line is wound. With this arrangement the occupant of the basket by slackening the line may, without outside aid, lower himself as slowly as he may desire.

To admit of outside aid in effecting the gradual lowering of the occupied basket independently of the check-line, I furnish each overbalancing-weight with a dependent line $h$, which is held by persons on the pavement or street and by them gradually paid out.

The overbalancing-weights consist, preferably, of iron vessels $e$, having a false bottom $i$ and a tube $j$, leading upward from the false bottom to the top of the vessel. The ropes $d$ pass down through the tubes and are secured below the false bottoms in any suitable manner. In the drawing the securing of the said ropes is effected by rings $k$, to which the dependent cords $h$ are attached. The cords $h$ when not in use are coiled on the ground and the hollow overbalancing-weights placed over them.

If the vessels $e$ are not in themselves heavy enough to more than balance the basket together with some considerable additional weight, I fasten in the spaces below the false bottoms iron disks $m$, as shown in Fig. 3, and for the sake of convenience the wire ropes $d$ pass through the disks, as shown. The overbalancing-weights may be rendered ornamental by filling the portions of the vessels above the false bottoms with earth and some suitable growing plants, as shown in Figs. 1 and 2.

It will be understood that the basket when not in use is kept in the position shown in Figs. 1 and 2, either with the check-line $f$ wound around the cleat $g$ or detached from it.

The fire-escape described affords a safe means of exit from burning buildings under any circumstances; but when used with the aid of persons on the street, and particularly professional firemen, who manipulate the lines $h$ from the ground, a large number of persons may be removed safely from a building in a short space of time.

I claim as my invention—

In combination with a building, and sheaves supported from the face of the building, a basket, suspension-ropes which lead from the basket over the sheaves, overbalancing-weights attached to the ends of the ropes, which weights, when the basket is at its highest point or in a position in which it may be entered from a window of the building, rest on the ground, and other ropes attached to the overbalancing-weights, and adapted when the basket is in its highest position to reach the ground, whereby the descent of the basket may be controlled from the ground, and a check-rope one end of which is attached to the building, and the other end adapted to be coiled within the basket, whereby the rapidity of descent of the basket may be regulated by a person in the basket, substantially as specified.

JAMES T. SMITH.

Witnesses:
WM. T. HOWARD,
G. H. POUDER.